No. 678,680. Patented July 16, 1901.
C. NASH.
NUT LOCK.
(Application filed Mar. 9, 1901.)
(No Model.)
Fig. 1.
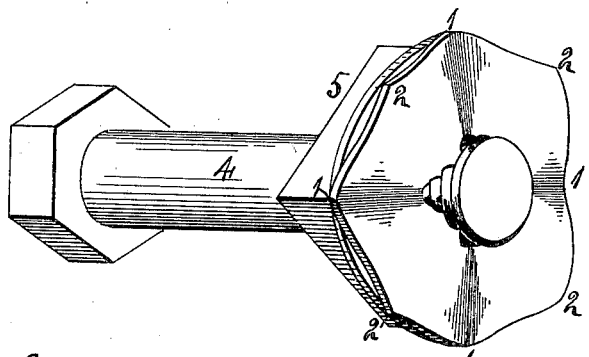
Fig. 2.
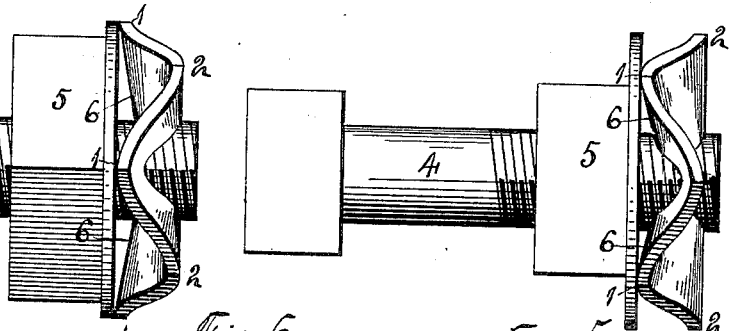
Fig. 3.
Fig. 4.
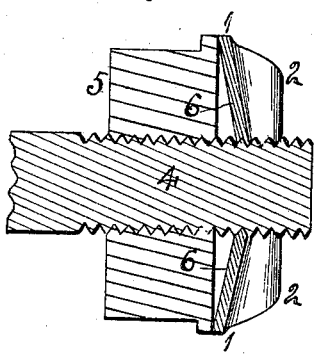
Fig. 6.
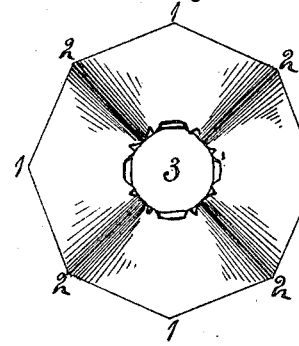
Fig. 5.
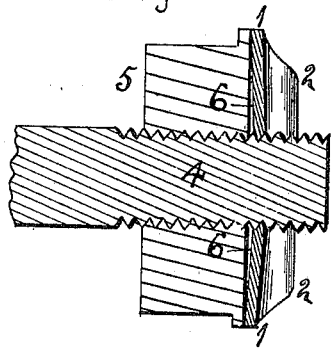
Witnesses:
M. L. Taylor
E. Behel.
Inventor:
Chester Nash
By A. O. Behel. Atty

UNITED STATES PATENT OFFICE.

CHESTER NASH, OF OREGON, ILLINOIS.

NUT-LOCK.

SPECIFICATION forming part of Letters Patent No. 678,680, dated July 16, 1901.

Application filed March 9, 1901. Serial No. 50,499. (No model.)

*To all whom it may concern:*

Be it known that I, CHESTER NASH, a citizen of the United States, residing at Oregon, in the county of Ogle and State of Illinois, have invented certain new and useful Improvements in Nut-Locks, of which the following is a specification.

The object of this invention is to construct a nut-lock comprising a concave disk internally screw-threaded and provided with radial corrugations in order that the outer edge of the disk may yield.

In the accompanying drawings, Figure 1 is a perspective view of my improved nut-lock in connection with a bolt. Figs. 2 and 3 are side elevations of the same. Fig. 4 is a lengthwise section of the bolt, combined nut and washer, and nut-lock, the lock having been turned until it comes in contact with the washer. Fig. 5 is a similar section in which the lock has been turned up against the washer nearly its full extent. Fig. 6 is a face representation of the nut-lock.

My improved nut-lock is made from spring material, preferably from sheet metal, and of a thickness to give the proper tension. This disk is formed with a series of corrugations 1 and 2, in this instance being deeper at the outer edge of the disk than at the center. The central opening 3 of the disk is then screw-threaded. The disk in this instance is eight-sided. In the drawings I have shown my improved nut-lock in connection with a bolt 4, upon which is turned a combined nut and washer 5, and in Figs. 1 to 4, inclusive, the nut-lock is not tightened, but only turned until it rests against the washer of the combined nut and washer.

In Figs. 2 to 4, inclusive, it will be noticed that the under faces 6 of the corrugations 1 are concave and do not lie their entire length in contact with the washer of the combined nut and washer, but only touch at their outer points, and up to this position the nut-lock will turn easily.

After the combined nut and washer has been turned up against the material it is intended to hold a wrench is then applied to the nut-lock disk, by means of which it is turned into the position shown at Fig. 5, which shows the concave face of the corrugations 1 to be considerably flattened, so that the inner face 6 of the corrugations lie in contact with the washer of the combined nut and washer nearly its entire length, and in this position the bolt-nut is securely locked. In turning the nut-lock into the position shown at Fig. 5 the concavity of the corrugations will lessen, which will cause the walls of the center opening 3 to contract upon the bolt, thereby adding to the friction and holding it with greater force.

It is obvious that the number of corrugations, their depth, and the number of sides given to the disk may be varied, and in place of the combined nut and washer a nut and washer or a nut alone could be employed without departing from the scope of my invention.

I claim as my invention—

A nut-lock comprising a disk of spring material having a central screw-threaded opening, and a series of radial corrugations.

CHESTER NASH.

Witnesses:
CHAS. C. TYLER,
C. E. ALTECS.